United States Patent
Farah (10) Patent No.: US 8,244,223 B2
(45) Date of Patent: Aug. 14, 2012

(54) AUTOMATED TRANSFER OF WIRELESS PROVISIONING PARAMETERS BETWEEN EXISTING AND NEW DEVICES

(75) Inventor: Jeffrey J. Farah, North Brunswick, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 984 days.

(21) Appl. No.: 11/888,798

(22) Filed: Aug. 2, 2007

(65) Prior Publication Data

US 2009/0037207 A1 Feb. 5, 2009

(51) Int. Cl.
*H04M 3/42* (2006.01)
(52) U.S. Cl. .............. 455/414.1; 455/414.3; 455/419; 455/432.3; 455/425; 379/201.02
(58) Field of Classification Search .......... 455/414.1, 455/410–411, 418–420, 432.3, 550.1, 414.2–414.3, 455/423–425; 379/201.02–201.03, 201.12
See application file for complete search history.

(56) References Cited

U.S. PATENT DOCUMENTS

| | | | |
|---|---|---|---|
| 6,965,781 B1 * | 11/2005 | Lewis | 455/522 |
| 2005/0085220 A1 * | 4/2005 | Benco et al. | 455/414.1 |
| 2006/0199613 A1 * | 9/2006 | Almgren | 455/558 |
| 2007/0149178 A1 * | 6/2007 | Thorson et al. | 455/414.1 |
| 2008/0287107 A1 * | 11/2008 | Carinio | 455/414.1 |

* cited by examiner

*Primary Examiner* — Marcos Torres (57) ABSTRACT

A method, computer program, apparatus and system that permits provisioning information and service account authorization on a wireless network to be transferred from an existing wireless device to a new wireless device by operation of the wireless devices. The method includes transferring provisioning information from the existing wireless device to the new wireless device; establishing a communication link with the wireless network; sending a service transfer request from the existing wireless device to the wireless network; and, in response to the transfer request, activating the new wireless device for service on the network.

37 Claims, 8 Drawing Sheets

AUTOMATED TRANSFER OF WIRELESS PROVISIONING PARAMETERS BETWEEN EXISTING AND NEW DEVICES

FIELD OF THE INVENTION

The present invention generally relates to wireless communications devices, such as wireless telephones and wireless-enabled personal computers (PCs) or personal digital assistants (PDAs), and more particularly to methods for provisioning and activating a new wireless device for service on a wireless network.

BACKGROUND OF THE INVENTION

In order to make a new wireless device usable for communications over a wireless network operated by service provider, it is customarily required to have the wireless service provider associate the device's unique identifier (e.g., an electronic serial number (ESN) for a cellular telephone or a media access control (MAC) address for a personal computer) with a service plan stored in the service provider's system, so that voice and/or data communications services of various types may be made over the service provider's system to and from the device and so that services contracted for and used by the device may be properly accounted for and billed by the service provider. Where the device is a mobile telephone, calls are made by entering a unique access number or identifier (such as a telephone number, a mobile identification number (MIN) or an IP address) that has been assigned to the device by the service provider's network, which also may be used to uniquely associate the device with services in a service plan. Where a new device is substituted for an existing device, it is also customarily required to have the wireless service provider transfer stored personal information (e.g., data constituting an existing personal telephone directory, photographs or music or other files) from the old device to the new device, and then to take further steps to deprovision or deactivate the old device.

A problem with this arrangement is that it requires the service provider to know in advance that an exchange of devices is to take place and to be involved as an active participant at every key step, with the service provider often supplying the new wireless device, or at the very least dictating conditions or imposing fees whenever it is desired to place a new device in service. The user often has little if any freedom of choice or control over the exchange, including its timing.

Accordingly, there is a need to provide a method for enabling a new wireless device to be placed into service that can be initiated by and is under the control of the user of an existing device. There is a further need to provide for transfer of activation which allows the user to select the device to which the transfer is to be made, to select the time at which the transfer is to be made, and to select personal information to be transferred, and to effect the transfer largely without the active intervention of the service provider and without interaction with the service provider's employees.

There is a further need to provide wireless devices and wireless communications systems arranged and configured to allow such a self-provisioning method to be employed.

There is a further need to provide computer programs residing in or downloaded to wireless devices, and residing in wireless networks, to allow such a self-provisioning method to be employed substantially automatically by the user.

BRIEF SUMMARY OF THE INVENTION

Briefly, the present invention is a method, apparatus, computer program product and system for transferring wireless provisioning parameters between existing and new devices and for activating the new device.

The method includes using an existing wireless device having an existing service account with a network service provider to provision a new wireless device for service on the wireless network by transferring information relating to the service account from the existing wireless device to the new wireless device; establishing a communication link between the existing wireless device and the wireless network; sending a service transfer request from the existing wireless device to the wireless network service provider; and, in response to the transfer request, activating the new wireless device for service on the network with the existing service account.

In further aspects of the method according to the invention, the existing wireless device may be deactivated as the new device is activated, and in response to the transfer request, a service plan stored in the network previously associated with a unique identifier, e.g., the ESN or MAC of the existing wireless device, may be associated with the unique identifier of the new wireless device. A communication link between the existing wireless device and the new wireless device may be established through a network, such as the wireless network providing service to the existing device or another network accessible by the existing and new wireless devices, such as the Internet. Alternatively, the communication link may be established over a short range connector such as a cable, an infrared (IR) link, or a short range radio frequency (RF) link, such as a Bluetooth link. The communication link established between the existing and new wireless devices may be used to transfer information including the access number of the existing device, and personal information such as a personal telephone directory, photographs or music or other files, to the new wireless device.

In another aspect of the invention, the existing wireless device has a service transfer computer program with code that performs the steps of sending a unique identifier for the new wireless device, receiving an acknowledgment from the new wireless device, transferring of information to the new device, receiving acknowledgment of receipt of information, and sending to the wireless network a request for service transfer from the existing wireless device to the new wireless device. The new wireless device has a service transfer computer program with code that performs the steps of receiving a unique identifier sent by the existing wireless device, verifying the unique identifier as one associated with the new wireless device, sending an acknowledgement signal upon verifying the unique identifier, receiving and storing information, and communicating with the wireless network. The service transfer computer programs may reside in the wireless devices, or may be downloaded to the devices from the wireless network or the Internet in response to a request to provision a new wireless device. The wireless network has a service transfer computer program with code that performs the steps of receiving a transfer request from an existing wireless device, and transferring service on the network from the existing wireless device to the new wireless device to which service account information has been transferred by the user.

In another aspect of the invention, the invention includes a system comprising a wireless network, an existing wireless device and a new wireless device, and service transfer computer programs with code as described above to transfer wireless provisioning parameters, including account or personal information or service activation requests or both, from the existing wireless device to the new wireless device under the control of a user.

The present invention has several advantages. It enables an owner of an existing wireless device to transfer information, including stored personal data such as address books, pictures, music and data files, to a new wireless device, and to have the new wireless device activated with a service plan stored on a service provider's wireless network, without involving the active intervention of the service provider operating the wireless network or its employees. The service provider need participate in the process only to the extent of passively responding to a request made electronically by a customer to transfer service to new identified device.

The present invention enables a user to control the source and identity of the new wireless device (so long as it is compatible with the network coding system, e.g., GSM or CDMA), and to control the timing of the transfer. Another advantage is that the network can make the transfer automatically under program control and the user may escape the imposition of fees and charges associated with having personnel in the employ of the service provider perform the transfer. Still other advantages include enabling the user to control the nature and quantity of the personal information transferred from one device to the other. These and other objects, advantages and features of the invention are set forth in the attached description.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

DETAILED DESCRIPTION OF THE INVENTION

Figure 1:
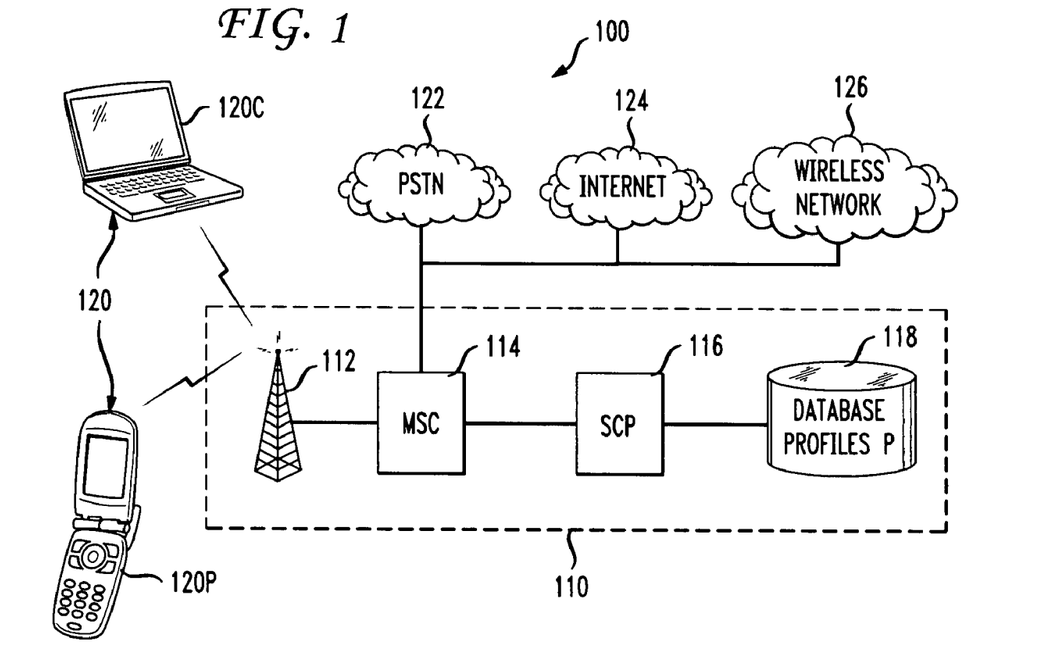
FIG. 1 shows elements of a wireless communication system in which the present invention is practiced.

FIG. 1 illustrates a wireless communication system 100 arranged in accordance with the present invention for transferring wireless provisioning parameters between existing and new wireless devices.

The system 100 includes a wireless network 110 under the control of a service provider, with a base station 112, a mobile switching center (MSC) 114, a service control point (SCP) 116, and a database 118. An existing wireless device 120, such as a wireless phone 120P or a wireless computer 120C, is connected to base station 112 via wireless communication links 140. Wireless computer 120C may be, for example, a personal computer (PC) with a wireless card, or a personal digital assistant (PDA) with wireless capability. The wireless network 110 is shown connected to public switched telephone network (PSTN) 122 and also may be connected to the Internet 124, other wireless networks 126 and other communication systems. The structure and function of wireless network elements 112, 114, 116 and 118 are well known in the communication arts, as are the structure and function of the PSTN 122 and Internet 124.

Database 118 stores a set of profiles P associated with each wireless device 120 authorized by the service provider to use the wireless network 110. Typically, in a cellular network, a wireless phone 120P has an electronic serial number (ESN) uniquely associated with the device, and also has a unique access number or mobile identification number (MIN) assigned to the phone 120P by the service provider and associated with the ESN, both of which are uniquely associated with the profile P for that device and both of which typically are used to authenticate a device when it attempts to connect to network 110. The MIN assigned to a cellular phone is the calling number or access number associated with the phone, i.e., the number that is dialed, keyed or otherwise entered to access or reach the user of wireless phone 120P. In certain circumstances the wireless phone 120P may also have an extended MIN (EMIN) which includes an extension code so that a number of phones may share the same MIN, as disclosed for example in U.S. Pat. No. 6,501,946. Alternatively, in a network that is IP-based, a device will be accessed by entering an IP address uniquely associated with the device, and with service parameters or profile P being associated with the device's IP address. The IP address may be entered directly or as a translation of a conventionally formatted telephone access "number" entered by a user.

In the case of wireless computer 120C, the computer's MAC address is analogous to the ESN and is used to access the device and to associate the computer with a profile P for that device.

The profile P can be stored at a network-based service control point 116, at a mobile switching center 114, or elsewhere within the network 110. The profile identifies the services that can be executed and/or used by the wireless devices 120. It is in this network-based profile that the services assigned to the device are kept, monitored, updated, and the like. Typically, the profile is accessible to the user of a wireless device 120P or 120C by means of a security protocol, such as a password-protected logon procedure, which permits the user to enter a user ID and password to access the account, and to add, subtract or change services, preferences and the like in the account the user maintains with the service provider that operates wireless network 110. Other security protections, such as a proximity detector, may be used in lieu of or in addition to a password-protected logon procedure. As will be described below, in the present invention the user is also able to direct the service provider to transfer the account to a new wireless device that has been selected by the user and appropriately identified to the account with its unique identifiers and security entry. Also, as will be described below, the service provider may determine from the unique ESN of the new wireless device various capabilities of the device, such as the ability to take photographs or videos or to store music or to connect with the Internet, and may propose to the user new network services related to new capabilities that it detects, such as image transfer services.

The profile can contain conventional information, such as user name and billing information and choice of calling plan or data plan subscribed to. The profile can contain a variety of other information regarding calling limitations such as area code, time of day, day of the month, and the like. Likewise, the calling can be restricted to local, national instead of international, or merely restricted to a certain predetermined set of telephone numbers. These calling limitations can be placed on outbound calls and/or inbound calls based on data such as automatic number identification (ANI). The profile can also limit the functions of the handset itself based on parameters such as time of day. For example, the profile can specify that the handset should not ring for incoming calls received late at night. As another example, the profile can specify alternative destinations based on time of day. For example, the profile can specify that all calls received at a business extension after business hours be routed directly to voice mail or to a supervisor's phone number. From the foregoing, it can be appreciated that the profile may require extensive information input if were required to be recreated for a new device.

Figure 2:
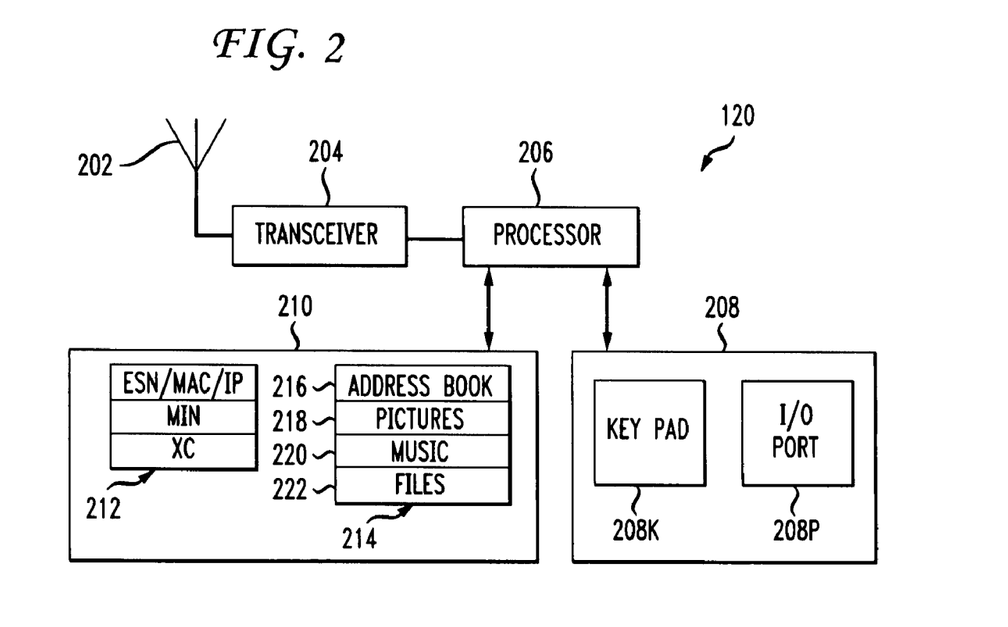
FIG. 2 is a block diagram of a wireless phone according to the invention.

FIG. 2 is a functional block diagram of a wireless device 120 such as wireless phone 120P or wireless computer 120C according to the invention. As shown, an antenna 202 connects through a transceiver 204 to a processor 206, which is in turn coupled to input-output devices 208, such as keypad 208K and a connection port 208P (e.g., a USB port), and a memory 210. Memory 210 includes a section 212, that cannot typically be altered by other than the service provider/phone manufacturer, and that stores authentication information including the device's ESN and MIN, or MAC address, or IP address. Memory 210 further includes a memory section 214 that stores user-supplied/alterable information such as an address book 216, pictures 218, music 220 and user files 222 that may include email, text messages, word processing files, spreadsheets, etc.

Figure 3:
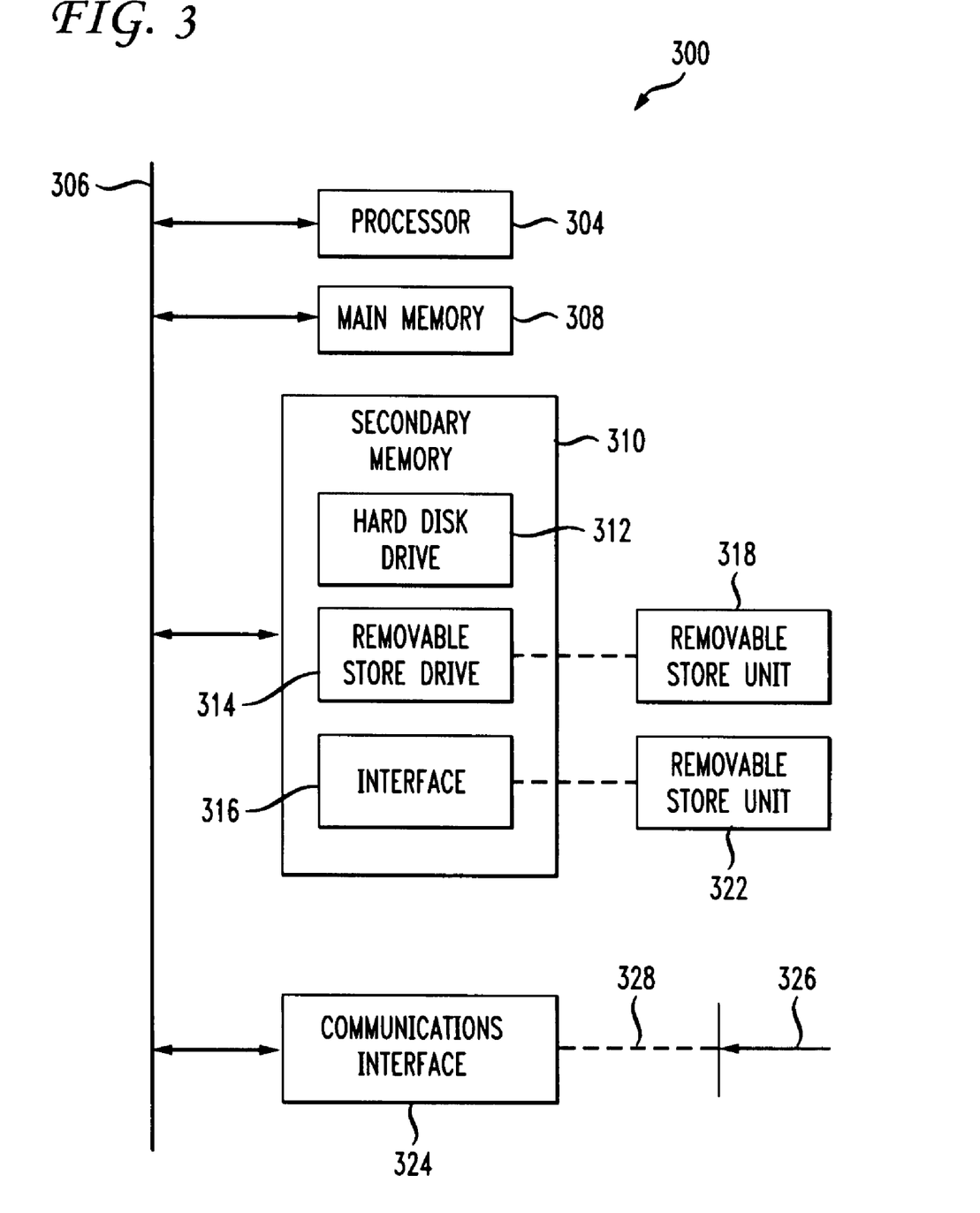
FIG. 3 shows a processor which may be used in a wireless phone or wireless network according to the present invention.

The wireless devices 120 as well as network elements MSC and SCP include a programmable processor, such as processor 206 shown in FIG. 2. For purposes of illustration, FIG. 3 shows the elements of a computer system 300 which may be used as the processor in any of these devices. The computer system 300 includes one or more processing units, such as processing unit 304. The processing unit 304 is connected to a communication bus 306. Various software embodiments are described in terms of this illustrative computer system. After reading this description, it will become apparent to a person skilled in the relevant art how to implement the invention using other computer systems and/or computer architectures.

Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318, represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar means for allowing computer programs or other instructions to be loaded into computer system 300. Such means can include, for example, a removable storage unit 322 and an interface 320. Examples of such include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 318 to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a PCMCIA slot and card, etc. Software and data transferred via communications interface 324 are in the form of signals which can be electronic, electromagnetic, optical or other signals capable of being received by communications interface 324. These signals 326 are provided to communications interface 324 via a channel 328. This channel 328 carries signals 326 and can be implemented using wire or cable, fiber optics, a phone line, a cellular phone link, an RF link and other communications channels.

In this document, the terms "computer program product", "computer program medium" and "computer usable medium" are used to generally refer to media such as removable storage device 318, a hard disk installed in hard disk drive 312, and similar media external to computer system 300 having program code transferrable to computer system 300 via communications interface 324 and signals 326. These computer program products are means for providing software to computer system 300.

Computer programs (also called computer control logic) are stored in main memory 308 and/or secondary memory 310. Computer programs can also be received (i.e., downloaded) via communications interface 324. Such computer programs, when executed, enable the computer system 300 to perform the methods of the present invention. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

The present invention permits the user of an existing wireless device 120 with an existing service account and profile P on the wireless network 110 to provision or program a new wireless device that the user has obtained from a source of the user's choosing.

Figure 4A:
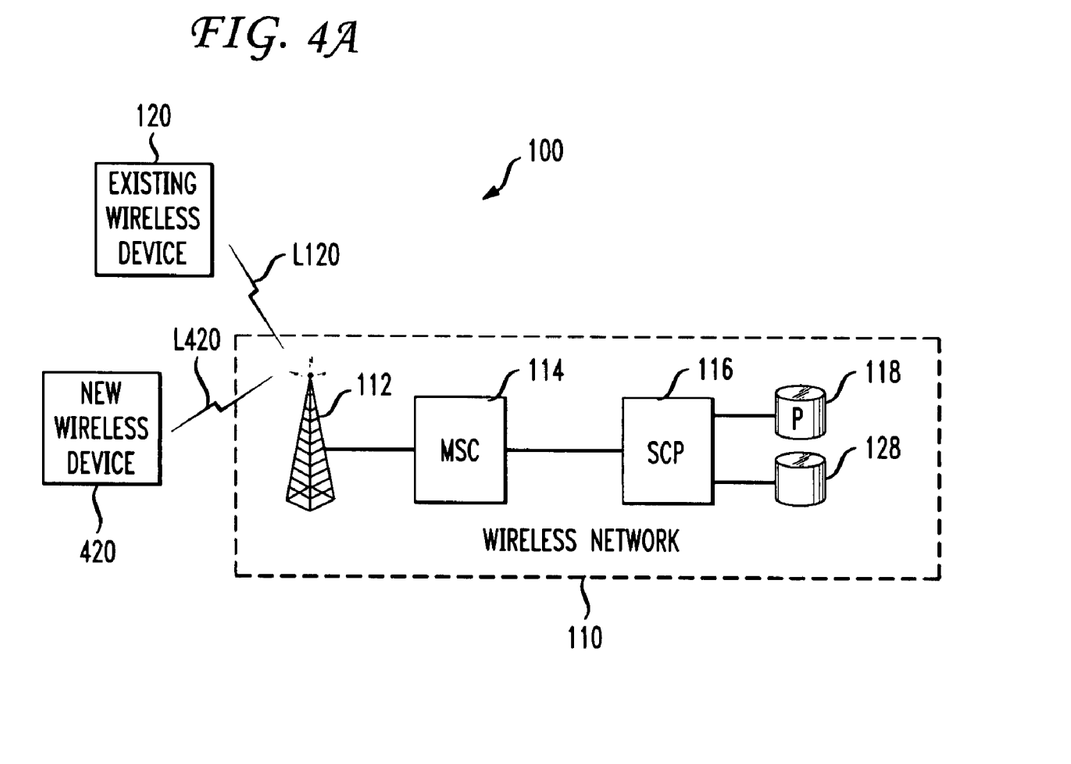
FIG. 4A is a diagram showing a communication link established between an existing wireless device and a new wireless device through a wireless network according to the invention.

FIG. 4A is a schematic diagram showing a wireless communication link L120 established between network 110 and an existing wireless device 120 which has an existing profile P stored on database 118 in wireless network 110. A wireless communication link L420 is established between network 110 and a new wireless device 420 which is to have wireless provisioning parameters transferred to it according to the invention. As shown in FIG. 4, the communications links L120 and L420 and the network 110 form a communications link between existing wireless device 120 and new wireless device 420 to permit the transfer of information between the existing and new devices. Preferably, the link is established by authenticating the existing wireless device 120 with the network in the usual fashion (by activating it, e.g., by turning on the device) to create link L120. The new wireless device 420 is linked to network 110 over link L420 by activating the device, which sends the device's ESN or MAC address to network 110, but the new device will not be provided service because the new device's ESN or MAC address is not yet associated with a service profile stored in the network. The network 110 will recognize the new device 420 provided the device 420 and the network 110 are compatible, i.e., use the same wireless signalling format such as GSM (global system for mobile) or CDMA (code division multiple access). Once the link between the network and the existing and new devices is established, the network 110, preferably using security entries to assure authorized access, may permit the existing and new devices to communicate, and information may be transferred between the devices as will be explained in further detail below.

Figure 4B:
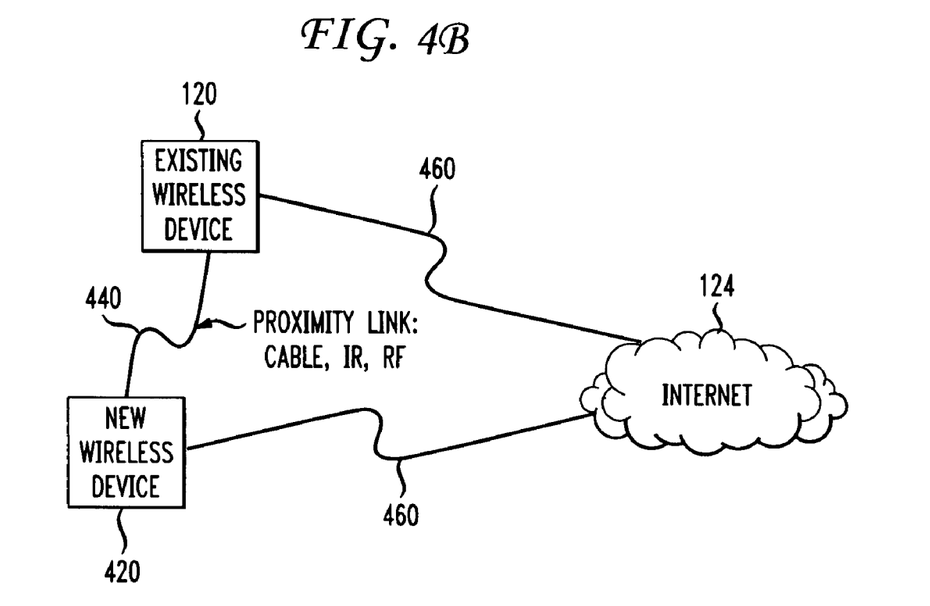
FIG. 4B is a diagram showing alternative communication links established between an existing wireless device and a new wireless device through a short-range connector or through the Internet according to the invention.

FIG. 4B illustrates an alternative communication link established between existing wireless device 120 and new wireless device 420 over a short range connector 440. The short range connector 440 may be provided by a cable connected to the two devices, an infrared link between infrared sensors on the two devices, or a short-range RF link between antennas on the two devices such as a Bluetooth® link between Bluetooth® transceivers on the two devices. Other short range communication links may occur to those of skill in the art. Such short range links permit provisioning information to be transferred from the existing device 120 to the new device 420 without any involvement of the service provider operating network 110. Alternatively, also as shown in FIG. 4B, a communication link between the existing device 120 and new device 420 may be established through the Internet 124, using WiFi links 460 for example.

Figure 5:
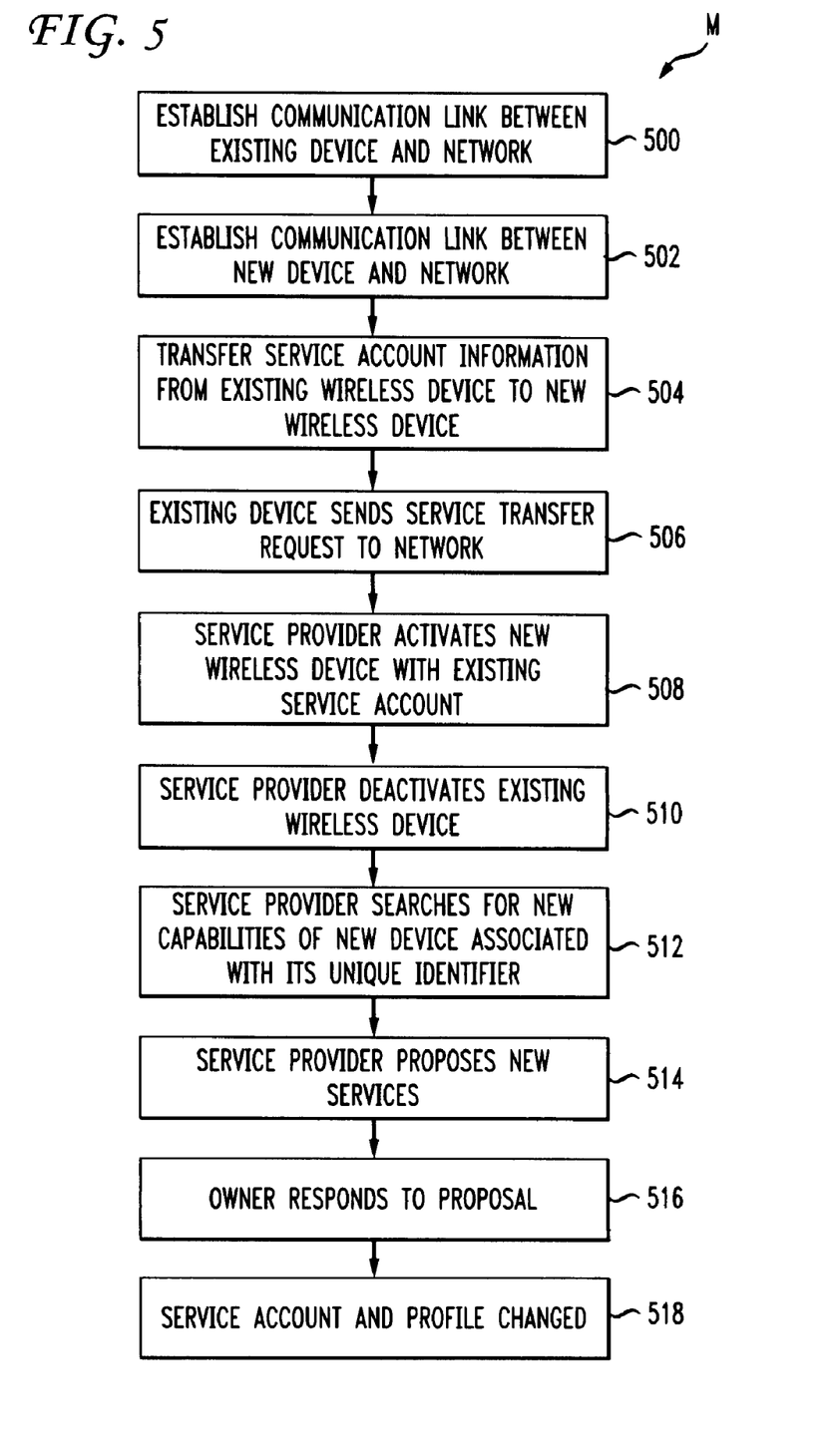
FIG. 5 is a flowchart showing the use of an existing wireless device to provision a new wireless device according to the invention.

FIG. 5 is a flowchart showing a method M in accordance with the present invention for using an existing wireless device 120 having an existing service account with a network service provider, to provision a new wireless device 420 for service on the wireless network 110. As shown in FIG. 5, in step 500 a communication link L120 is established between the existing wireless device 120 and the wireless network 110. In step 502, a communication link L420 is established between the new wireless device 420 and the wireless network 110. Communication link L420 may be used, for example, to convey identifying information about the new wireless device to network 110. Such identifying information may include the new device's unique identifier, such as its ESN or MAC. In step 504, information relating to the service account is transferred from the existing wireless device 120 to the new wireless device 420. The transferred account information typically includes the access or calling number or MIN of the existing wireless device 120, so that the new device 420 will be accessible or reachable by dialing or otherwise entering the same number as previously was used to access the existing (replaced) device. The transferred account information may also be provided by the new wireless device 420 to the network 110 over the link L420. The account information may be transferred using the links L120 and L420 and network 110, as shown in FIG. 4A and described in greater detail below, or simply may be transferred to the new wireless device manually by entering it into the memory of new device 420 using its keyboard 208K as shown in FIG. 2, for example, or may be entered using another input device. The account information alternatively could be transferred over short-range link 440 or Internet link 460 as shown in FIG. 4B. Although FIG. 5 shows the steps 500 and 502 occurring before step 504, it will be apparent that the sequence of steps may be varied depending on the particular method used for transferring information.

In step 506, the existing wireless device 120 sends a service transfer request to the wireless network service provider over the communication link L120. Such a service transfer request may be accompanied by information needed by the service provider, such as account login entries, or the unique identifier of the new wireless device 420, such as its ESN or MAC, if such information has not been provided to the network earlier or if its reentry is deemed important for security. In step 508, in response to the service transfer request, the service provider activates the new wireless device for service on the wireless network with the existing service account defined in profile P. The step of activation may be performed by the service provider by associating the account profile P in database 118 with the unique identifier of the new wireless device 420, such as its ESN or MAC. In step 510, the service provider deactivates the existing wireless device 120, as by disassociating the unique identifier of the existing device 120 with profile P.

In step 512, the service provider uses the unique identifier of the new wireless device to search for new capabilities of the new wireless device that are associated with the unique identifier. Such a search may be performed by automatically scanning an available look up table to see what device features are associated with the new device's unique identifier, and to compare these features with those associated with the existing device 120. For example, referring to FIG. 4A, the wireless network 110 may include a further database 128 which stores a table of ESNs and/or MACs and associated device features which may be accessed to determine the device features of the new wireless device 420, and to compare these features with services or features associated with existing wireless device 120. A similar look up table may be located elsewhere and accessed by the wireless network service provider, e.g., over the Internet. When new capabilities are found the service provider in step 514 proposes to the owner of the device service plan changes to correspond to detected new capabilities. If the new device is found to have a camera, for example, image transfer services may be offered, and may be readily accepted by the new device owner. In step 516 the new device owner responds to the service provider's proposal, and if the response is one requesting a change, in step 518 the service provider changes the service account and profile P in accordance with the request. These steps may be performed automatically under program control. In this manner, the service provider may efficiently offer and provide to the new device owner new revenue generating services.

Figure 6:
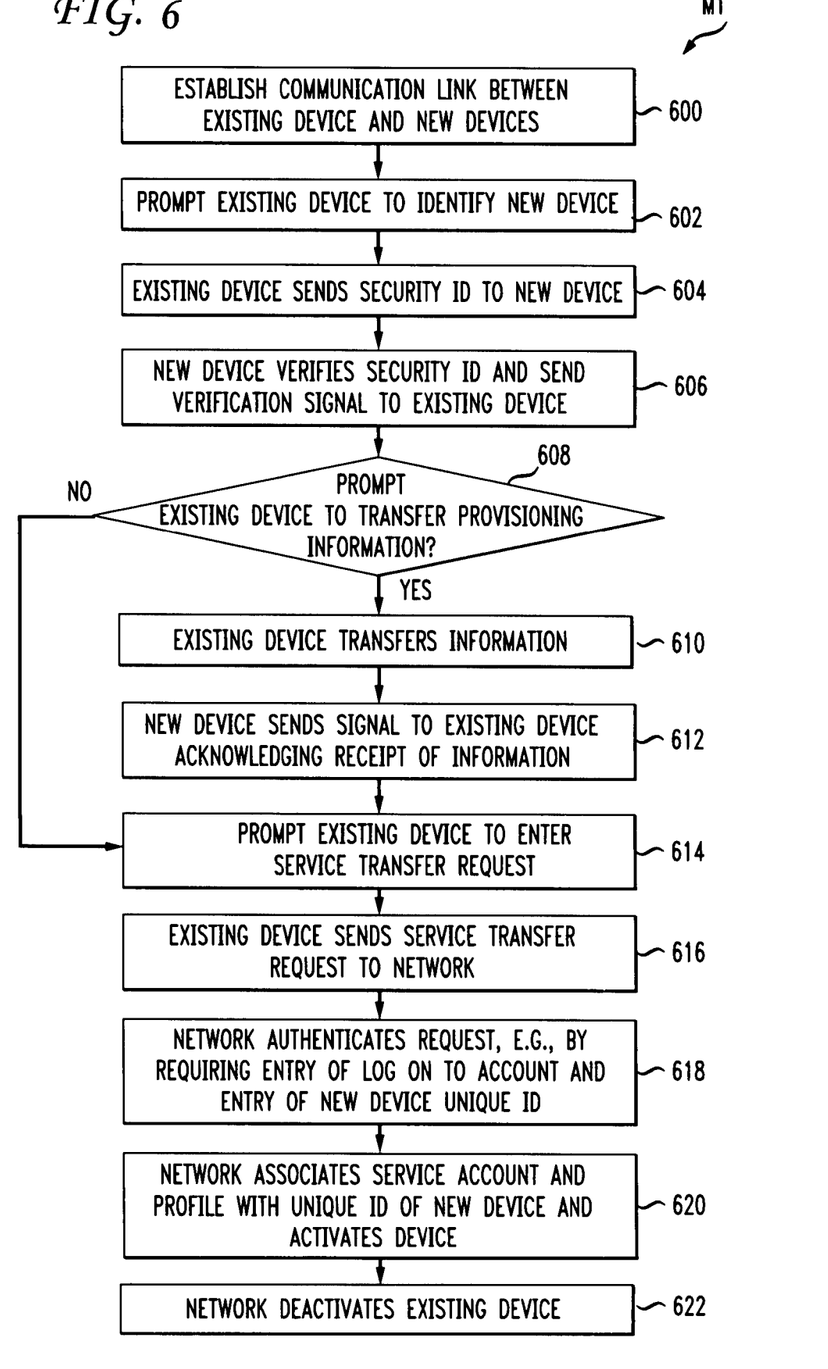
FIG. 6 is a flowchart showing a process performed by a communications system according to the invention.

FIG. 6 is a flowchart showing in greater detail a method MI for operating a system including an existing wireless device 120, a new wireless device 420 and a network 110, by using the existing wireless device 120 to provision the new wireless device 420 for service on the wireless network 110. As shown in FIG. 6, in step 600 a communication link is established between the existing wireless device 120 and the new wireless device 420. The communication link may be a wireless transmission link through the network 110, as shown in FIG. 4A, or a communication link over a short range connector 440, or the Internet 124, as shown in FIG. 4B. In step 602, the existing wireless device 120 is prompted to enter a unique security identifier, such as an ESN or MAC address, for the new device 420. In step 604, the existing wireless device sends the entered security identifier over the established communications link to the new wireless device 420. In step 606, the new wireless device 420 verifies that the received security identifier matches that of the new device and sends verification to the existing device 120.

In step 608, after receiving verification, the existing device 120 is prompted to transfer one or more elements of stored provisioning information to the new wireless device 420. The prompt may be in the form of a menu with selectable items, and the prompts may relate to account related information such as the device's access or calling number or MIN as well as personal information such as a directory, pictures, music or files. If the response to the prompt is "yes", the method proceeds to step 610. If the response to the prompt is "no", the method proceeds to step 614.

In step 610 the existing device 120 transfers account information and/or personal information over the communication link to the new device 420. In step 612, the new device 420 acknowledges receipt of the information by sending an acknowledgement signal back over the communications link to the existing wireless device 120.

At this point, in step 614, the existing wireless device 120 is prompted to enter a service transfer request to the network 110. In step 616, the existing wireless device sends the service transfer request to the network 110. In step 618, the network authenticates the request, and may request the existing device to log onto the service account by entering a user ID and password, and to enter or reenter the security identifier or ESN or unique ID of the new wireless device. In step 620, the network 110 responds to the service transfer request by associating the security identifier of the new wireless device 420 with the service account and profile P formerly associated with the existing wireless device 120, and if not otherwise transferred, by transferring the access or calling number or MIN of the existing wireless device to the new wireless device, thereby completing activation of the new wireless device. Alternatively, as described above with reference to FIG. 5, the access number or MIN may be provided to the new wireless device either by transferring it from the existing wireless device 120 to the new device over the communication link, or by the user entering it directly into the new wireless device 420 using a keypad, for example. In step 622, the network deactivates the existing wireless device by removing the association of the security identifier (and MIN) of the existing wireless device 120 from the profile P. At this point in process M1, the new wireless device 420 is fully authorized for sending and receiving communications over network 110 in accordance with the permissions defined by profile P.

Figure 7:
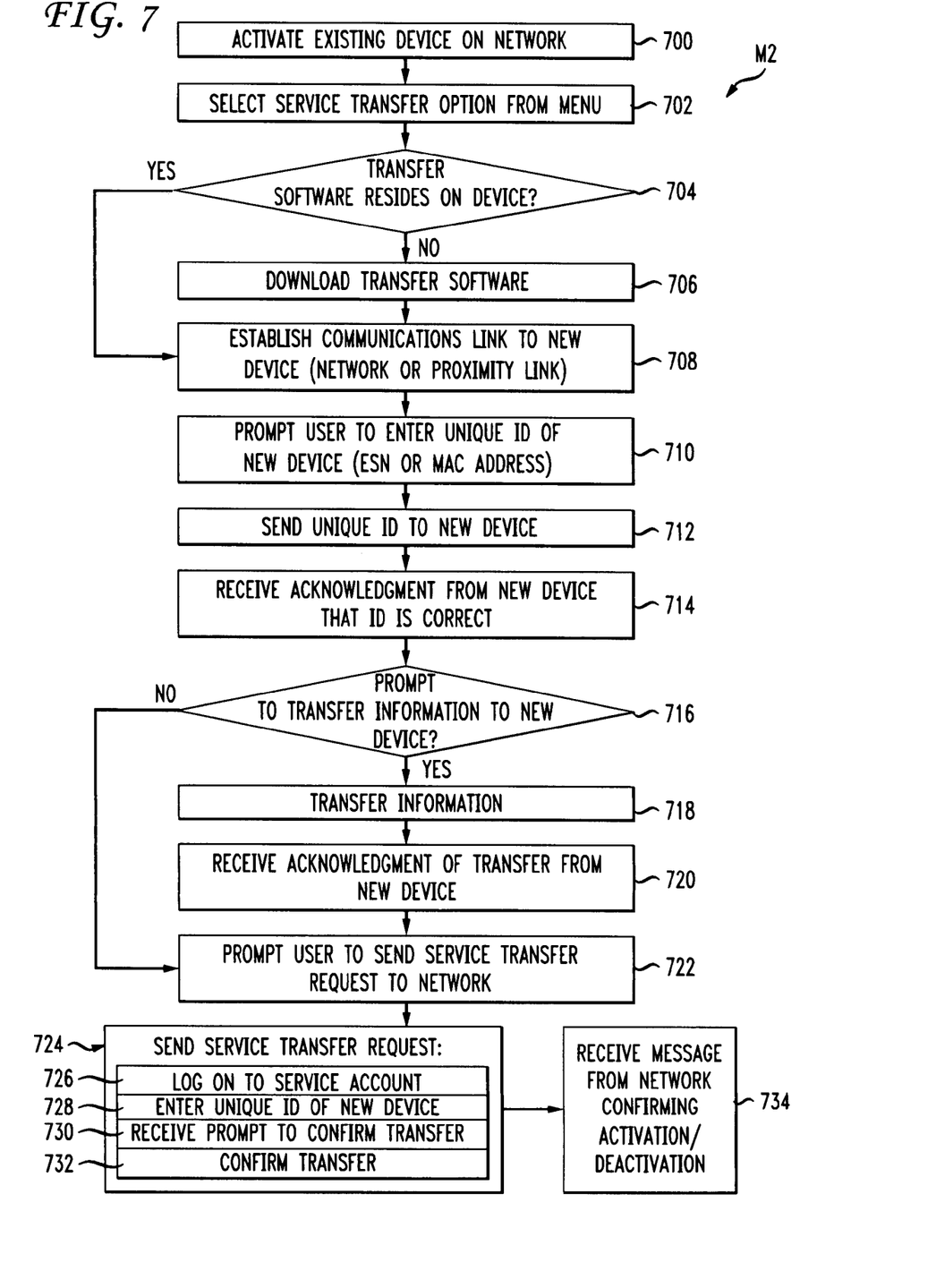
FIG. 7 is a flowchart showing a process performed by an existing wireless device according to the invention.

FIG. 7 is a flowchart showing a method M2 performed by an existing wireless device 120 to provision a new wireless device 420 according to the invention. Such a method may be performed by a software program either permanently residing in existing wireless device 120, or downloaded from network 110 or Internet 124 only when it is desired to provision a new wireless device. Method M2 illustrates steps including a software downloading provision. In step 700, the existing device is activated on network 110, either automatically upon turning on the device, or with entry of a code. In step 702, the user selects a "service transfer" option from a menu displayed on the existing device 120. In step 704, the device determines whether transfer software programs are resident on the existing device 120, and if the answer is "yes" the method proceeds to step 708, and if "no" in step 706 transfer software is downloaded to the existing device before proceeding to step 708.

In step 708, the user selects the communications link to be used for transferring provisioning information to the new device from a menu which may include, for example, the user may be offered the menu choices of "network", "cable", "IR", "RF", or "Internet". In step 710, the user is prompted to enter the unique ID of the new device 420, for example the ESN of a wireless phone or the MAC address of a computer. In step 712, the user enters and sends the unique ID of the new device 420, and in step 714 the device receives an acknowledgement from the new device that the ID is correct.

In step 716, the user receives a prompt to transfer provisioning information to the new device 420, and may receive a menu of options for the data to be transferred including account related items such as access number or "MIN" and personal items such as "address book", "pictures", "music", "files" and the like. If the user chooses not to transfer such information, the process proceeds to step 722. If the user chooses to transfer such information, in step 718, the user transfers selected provisioning information to the new device 420 over the selected communications link. In step 720, the existing device receives an acknowledgement or confirmation from the new device 420 that the transfer of provisioning information is complete.

In step 722, after all requested information is transferred, the user is prompted to send a service transfer request to the network, and in step 724 the service transfer request is sent to the network 110. As shown in FIG. 7, the service transfer request of step 724 may include further steps such as in step 726, logging onto the service account of the existing device, in step 728, entering the unique identifier of the device to which service is to be transferred (ESN or MAC address), in step 730, prompting to confirm that the service transfer is to take place as entered and, in step 732, confirming the transfer.

In step 734, the existing device receives from network 110 a message that the new device is activated and the existing device is deactivated. In step 734 the existing device 120 may further receive, as part of a deactivation, signals which remove the MIN from the device or otherwise change the configuration of the device.

The steps 700 through 734 in method M2, as will be appreciated by those of skill in the art, will be incorporated in computer program software to be stored in the existing device 120, either initially or when downloaded upon request, and performed by processors such as processor 206 of FIG. 2 or the computer system 300 of FIG. 3. A wireless device apparatus according to the invention is one which contains the stored software and devices in the form of processor 206 or computer system 300 for executing the software and for performing the method steps of method M2.

Figure 8:
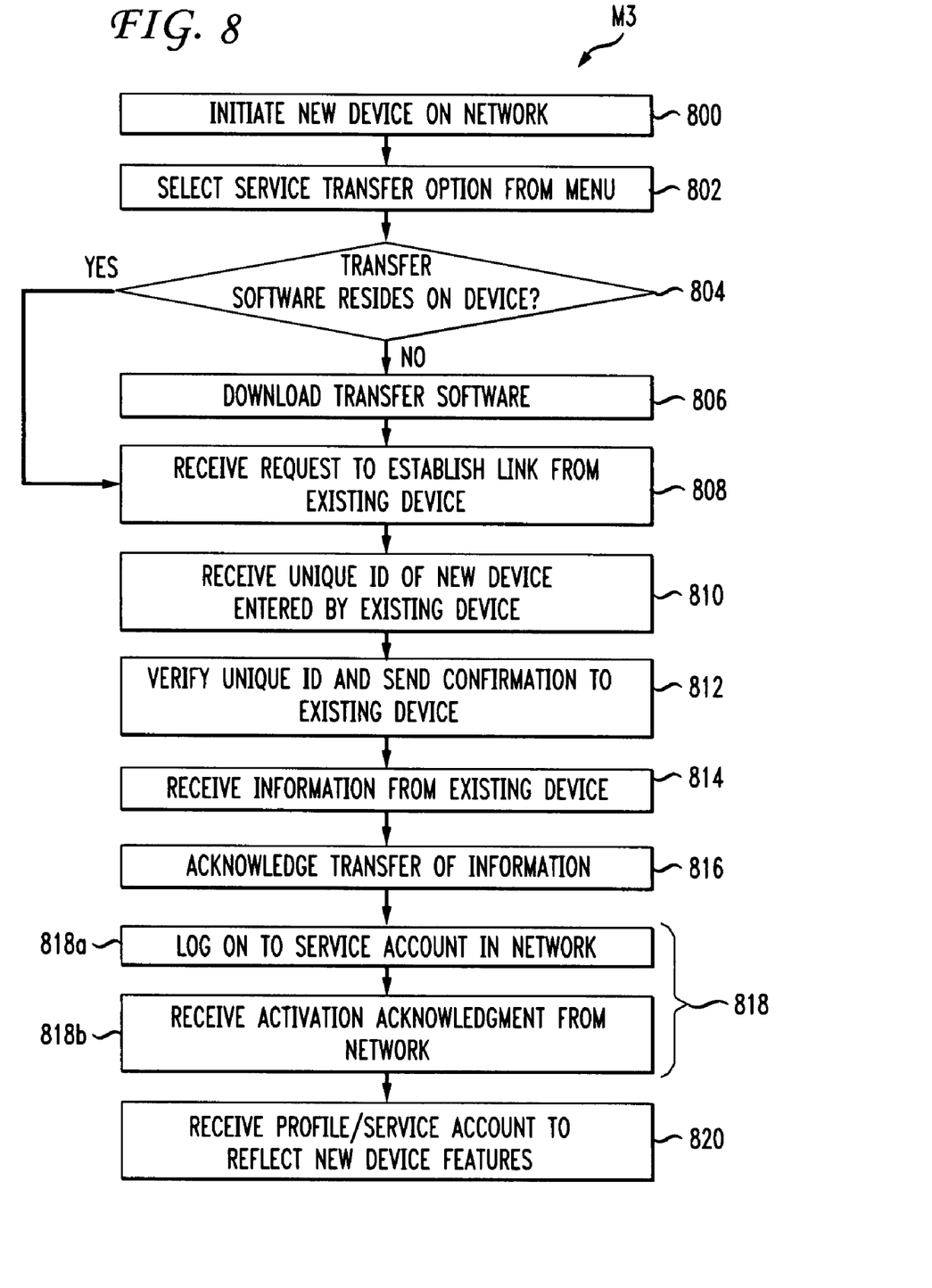
FIG. 8 is a flowchart showing a process performed by a new wireless device according to the invention.

FIG. 8 is a flowchart showing a method M3 performed by a new wireless device 420 to be provisioned by an existing wireless device 120 according to the invention. In step 800, the new device 420 is coupled to the network 110, for example by turning it on. If the new device is compatible with the network, and uses the same signaling format, the network will recognize the unique security identifier of the device, such as its ESN or MAC address, and can communicate with the device although it will not authorize other service as there is no service account or profile P associated as yet with the new device 420. The network may send messages to the new device reflecting its status, or may request the entry of unlocking codes or information necessary to establish service.

In step 802, the user of the new device 420 selects a "service transfer" option on a menu displayed on the device, and in step 804 the device determines whether transfer software programs are resident on the new device 420, and if yes the method proceeds to step 808, and if not in step 806 transfer software is downloaded to the existing device before proceeding to step 808. In step 808, the new device 420 receives a request to establish a communications link with existing device 120, and in step 810 receives a signal representing the unique ID of the new device, for example its ESN or MAC address. In step 812, the new device verifies the received unique ID, and sends a confirmation of its receipt to the existing device 420.

In step 814, the new device 420 receives provisioning information, including account information such as an access number or MIN and/or personal information such as address book, photos, music and files, from the existing device 120 over the communications link, and in step 816 sends a confirmation of its receipt to existing device 120.

In step 818, the new device 420 is activated on the network 110. Such activation may occur without any action by the user of the new device 420. Alternatively, such activation may require, in step 818a, logging on to the existing service account and profile P on the network 110, and in step 818b, confirming activation and receiving an activation message from the network.

In step 820, the new device 420, after logging in to the service account, may revise the profile P with which it is now associated and may subscribe to different calling plans or data plans or select new services to reflect new device features. For example, the new device 420 may have camera or messaging features not present in the existing device 120 for which new or different service offerings by the network would be advantageous. As described with reference to FIG. 5, the service provider may search for device capabilities related to a device's unique identifier such as its ESN or MAC and may propose service offerings to the user of the new device.

The steps 800 through 820 in method M3, as will be appreciated by those of skill in the art, will be incorporated in computer program software stored in the device, either initially or when downloaded upon request, and performed by processors such as processor 206 of FIG. 2 or the computer system 300 of FIG. 3. A wireless device apparatus according to the invention is one which contains the stored software and devices in the form of processor 206 or computer system 300 for executing the software and for performing the method steps. While the methods M2 for an existing device and M3 for a new device have been described separately, it will be apparent that they may be combined in software to be supplied to a wireless device to be available for use either as a transferor or transferee of provisioning parameters.

Figure 9:
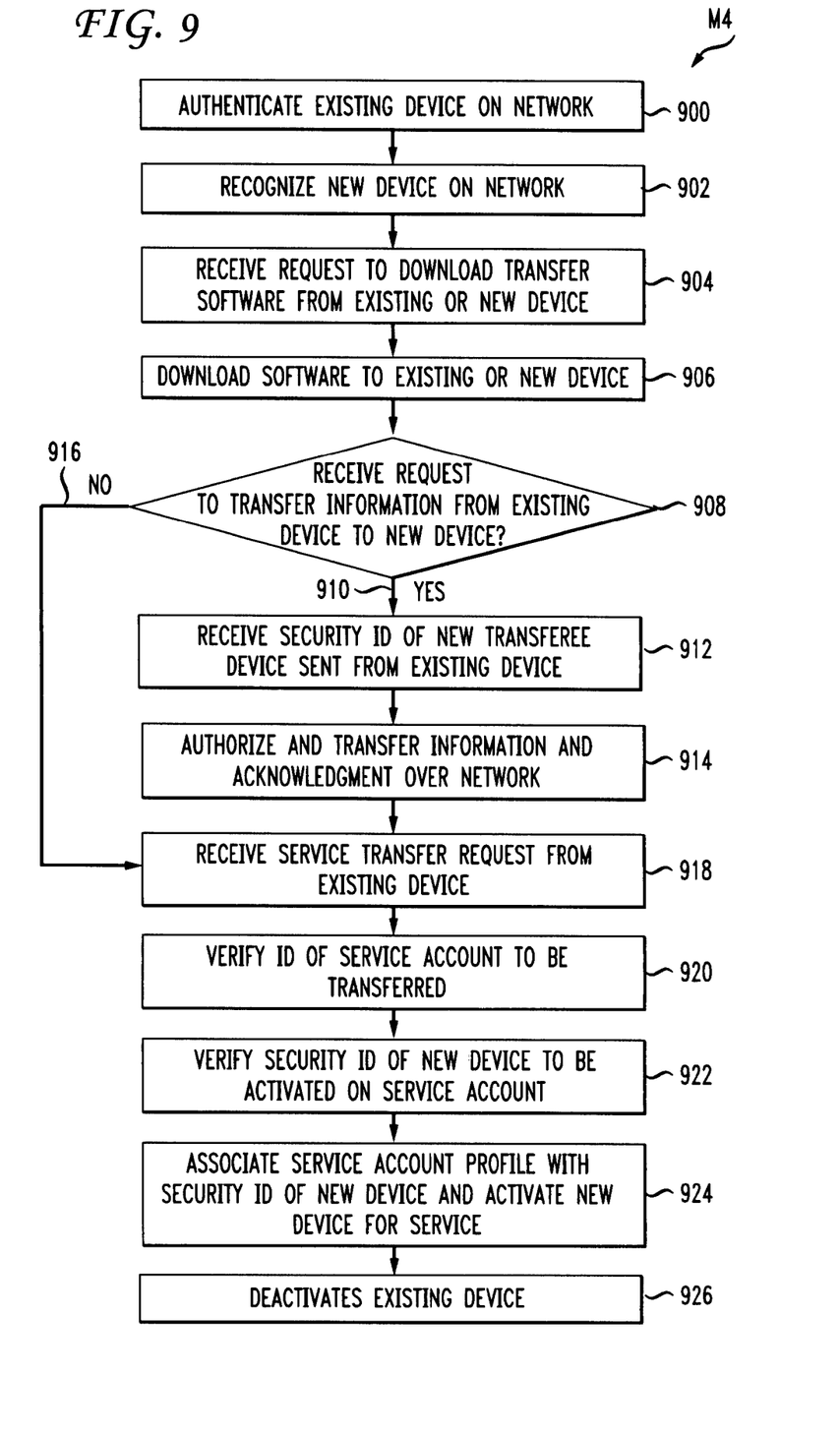
FIG. 9 is a flowchart showing a process performed by a wireless network according to the invention.

FIG. 9 is a flowchart showing a method M4 performed by a wireless network 110 to transfer provisioning information and service account authorization from an existing wireless device 120 to a new wireless device 420 according to the invention. In step 900, the network authenticates the existing device, either automatically when the device is turned on or enters a service area, or by entry of a code. In step 902, the network 110 recognizes the new device 420 when it is turned on within the service area of the network. As indicated above, if the new device is compatible with the network, and uses the same signaling format, the network will recognize the unique security identifier of the device, such as its ESN or MAC address, and can communicate with the device although it will not authorize other service as there is no service account or profile P associated as yet with the new device 420. The network may send messages to the new device reflecting its status, or may request the entry of unlocking codes or information necessary to establish service.

In step 904, the network 110 may optionally receive a request to download transfer software from either the existing or new devices, and in step 906, in response to such a request, downloads the requested software to one or both of the new and existing devices. In a preferred embodiment, the downloaded software will perform the methods shown in FIG. 7 or 8.

In step 908, the network may receive a request from the existing device 120 to transfer provisioning information from the existing device 120 to the new device 420. If so, as indicated by the "yes" branch 910, the method M4 proceeds to step 912.

If not, as indicated by the "no" branch 916, the method proceeds to step 918. The circumstances under which the network will not receive a request to transfer provisioning information include either that the information previously has been transferred, e.g., by means of keyboard entry or one of the short range connection techniques illustrated in FIG. 4B, or that there is no information to transfer or there is no wish to transfer old information to a new device.

If it is desired to transfer provisioning information over a communications link through the network, as illustrated for example in FIG. 4, in step 912 the network 110 receives from the existing device 120 the security identification, such as the ESN or MAC address, of the transferee device, i.e., the new device 420 to which it is desired that provisioning information be transferred. In step 914, the network 110 authorizes and transfers the desired provisioning information, such as the existing device's access number or MIN, address book, photos, music and files, over the network to the identified new device 420, and then transfers a responding acknowledgement signal from the new device 420 to the existing device 120 to indicate that the transfer is complete.

In step 918, the network 110 receives a service transfer request from the existing device 120, which is a request to the network to transfer the existing service account and profile associated with the existing device 120 to the new device 420 and thereby activate the new device 420 for service on the network. In step 920, the network may require the identification of the service account to be verified by requiring, for example, that the existing device log on to the account with a user ID and password. In step 922, the network may require the unique identifiers or security ID, such as the ESN or MAC address, of the new device 420 to be again entered to verify that it is the device to be activated. In step 924, the network 110 associates the service account and profile P with the unique identifiers of the new device and activates the new device for service on the network. In step 926, the network 110 deactivates the existing device 120, terminating its ability to use the network for services. The network may further conduct a search to explore the capabilities of the new device 420 by means of its ESN and propose new service offerings, as described with reference to FIG. 5 and incorporated herein by reference.

The steps 900 through 926 of method M4, as will be appreciated by those of skill in the art, will be incorporated in computer program software stored in the network and performed by processors such as processor 206 of FIG. 2 or the computer system 300 of FIG. 3. A wireless network according to the invention is one which contains the stored software and means in the form of processor 206 or computer system 300 for executing the software and for performing the steps of method M4.

Thus, a feature for using an existing wireless device to provision a new wireless device for service on a wireless network has been described. The improved feature includes system, apparatus, computer program products and method. While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiments disclosed, but that the invention include all embodiments falling within the scope of the appended claims.

What is claimed is:

1. A method for operating a wireless network to facilitate transfer, by a user of an existing wireless device, of network service to a new wireless device, the transfer using an existing service account that is associated with the existing wireless device and established with the wireless network service provider, comprising:
   receiving from the existing wireless device having the existing service account a request to transfer the network service associated with the existing service account to the new wireless device;
   in response to the transfer request, transferring the network service associated with the existing service account and information relating to the existing service account from the existing wireless device to the new wireless device, the new wireless device having a unique identifier added, by the user, to the existing service account;
   detecting capabilities of the new wireless device associated with the unique identifier by
      determining the device features associated with the new wireless device's unique identifier,
      determining the device features associated with the existing wireless device's unique identifier, and
      comparing device features associated with the new wireless device with those associated with the existing device to detect new capabilities,
      wherein the unique identifier of the new wireless device is one of an ESN, a MAC, or an IP address, and the new capabilities of the new wireless device associated with its unique identifier include at least one of image recording, video recording, music storage, and Internet connectivity;
   transmitting to the new wireless device a proposal for a change to the existing service account to correspond to the detected capabilities of the new wireless device;
   in response to the transmitting, receiving from the new wireless device a request to change the existing service account to correspond to the new wireless device's detected capabilities in accordance with the proposal; and
   in response to the request from the new wireless device, changing the existing service account, in accordance with the proposal, to correspond to the new wireless device's detected capabilities.

2. The method claimed in claim 1 wherein the request to transfer network service the new wireless device includes the access number of the existing device.

3. The method claimed in claim 1 further comprising, before transferring the network service associated with the existing service account:
   receiving from the existing wireless device a service account security identifier, and
   receiving from the existing wireless device the unique identifier of the new wireless device.

4. The method claimed in claim 1 further comprising:
   in response to the transfer request, deactivating the existing wireless device for service on the wireless network.

5. The method claimed in claim 1 wherein the wireless network service provider stores a service plan profile in a database associated with the unique identifier of a wireless device, and further comprising:
   in response to the transfer request, changing the association for the wireless network database service plan profile from the unique identifier of the existing wireless device to the unique identifier of the new wireless device.

6. The method claimed in claim 1 wherein the transfer of network service is accomplished with a transfer software program, and following the request for a transfer of network service, determining whether a transfer software program presenting a series of transfer options that may be selected by the user is resident on a wireless device, and if it is not,
   downloading a service transfer program from the wireless network to at least one of the existing wireless device and the new wireless device.

7. The method claimed in claim 1 wherein the steps of receiving a request to transfer, transferring service, detecting capabilities, transmitting a proposal, receiving a request to change and changing the existing service account are performed by a processor.

8. The method claimed in claim 1 further comprising:
   establishing a communications link over the wireless network between the existing wireless device and the new wireless device for transfer of information.

9. The method claimed in claim 8 further comprising:
   transferring over the network communications link information including at least one of the existing device's access number, pictures, address book, music and data files.

10. The method claimed in claim 3 further comprising:
    before transferring the service account, receiving from the new wireless device the security identifier of the existing service account for the existing wireless device.

11. A wireless communications computer program product for operating a wireless network to facilitate transfer, by a user of an existing wireless device to a new wireless device, of network service to a new wireless device, the transfer using an existing service account that is associated with the existing wireless device and established with the wireless network service provider, comprising a computer usable tangible medium having computer readable program code means embodied in said medium, said computer readable program code means comprising:
   computer readable program code means for causing a computer to receive from the existing wireless device having the existing service account a request to transfer the network service associated with the existing service account to the new wireless device;
   computer readable program code means for causing a computer, in response to the transfer request, to transfer the network service associated with the existing service account and information relating to the service account from the existing wireless device to the new wireless device, the new wireless device having a unique identifier added, by the user, to the existing service account;
   computer readable program code means for detecting capabilities of the new wireless device associated with the unique identifier comprising
      computer readable program code means for determining device features associated with the new wireless device's unique identifier,
      computer readable program code means for determining device features associated with the existing wireless device's unique identifier, and
      computer readable program code means for comparing these device features associated with the new wireless device with device features associated with the existing wireless device to detect new capabilities,
wherein the unique identifier of the new wireless device is one of an ESN, a MAC, or an IP address, and the new capabilities of the new wireless device associated with its unique identifier include at least one of image recording, video recording, music storage, and Internet connectivity,
computer readable program code means for transmitting to the new wireless device a proposal for a change to the existing service account to correspond to the detected capabilities,
computer readable program code means for receiving, in response to the transmitting, a request from the new wireless device to change the existing service account to correspond to the detected capabilities in accordance with the proposal; and
computer readable program code means, in response to the request from the new wireless device, for changing the existing service account in accordance with the proposal to correspond to the detected capabilities.

12. The wireless communications computer program product claimed in claim 11 wherein the request to transfer network service includes the access number of the existing device.

13. The wireless communications computer program product claimed in claim 11 further comprising:
computer readable program code means for causing a computer, in response to the transfer request, to deactivate the existing wireless device for service on the wireless network.

14. The wireless communications computer program product claimed in claim 11 wherein the wireless network service provider stores a service plan profile in a database associated with the unique identifier of the existing wireless device and further comprising:
computer readable program code means for causing a computer, in response to the transfer request, to change the wireless network database association for the existing service plan profile from the unique identifier of the existing wireless device to the unique identifier of the new wireless device.

15. The wireless communications computer program product claimed in claim 11 further comprising:
computer readable program code means for determining, following the request for a transfer of network service, whether a transfer software program presenting a series of transfer options that may be selected by the user is resident on a wireless device, and if it is not, for causing a computer to download a service transfer program from the wireless network to at least one of the existing wireless device and the new wireless device.

16. The wireless communications computer program product claimed in claim 11 further comprising:
computer readable program code means for causing a computer to receive from the existing wireless device a service account security identifier before transferring the network service associated with the existing service account, and
computer readable program code means for causing a computer to receive from the existing wireless device the unique identifier of the new wireless device before transferring the network service associated with the existing service account.

17. The wireless communications computer program product claimed in claim 16 further comprising:
computer readable program code means for causing a computer to receive from the new wireless device the security identifier of the service account for the existing wireless device before transferring the network service associated with the existing service account.

18. The wireless communications computer program product claimed in claim 11 further comprising:
computer readable program code means for causing a computer to establish a communications link over the wireless network between the existing wireless device and the new wireless device for transfer of information.

19. The wireless communications computer program product claimed in claim 18 wherein the information transferred over the network communications link includes information comprising at least one of the existing device's access number, pictures, address book, music and data files.

20. A wireless network adapted to facilitate transfer, by a user of an existing wireless device, of network service to a new wireless device, the transfer using an existing service account that is associated with the existing wireless device and established with the wireless network service provider, comprising:
means for receiving from the existing wireless device having the existing service account a request to transfer the network service associated with the existing service account to the new wireless device;
means, in response to the transfer request, for transferring the network service associated with the existing service account and information relating to the existing service account from the existing wireless device to the new wireless device having a unique identifier added, by the user, to the existing service account;
means for detecting capabilities of the new wireless device associated with the its unique identifier;
means for detecting capabilities of the existing wireless device associated with its unique identifier;
means for comparing capabilities associated with the new wireless device with capabilities associated with the existing wireless device to detect new capabilities;
means for transmitting to the new wireless device a proposal for a change to the existing service account to correspond to the detected new capabilities, wherein the unique identifier of the new wireless device is one of an ESN, a MAC, or an IP address, and the new capabilities of the new wireless device associated with its unique identifier include at least one of image recording, video recording, music storage, and Internet connectivity;
means, in response to the transmitting, for receiving from the new wireless device a request to change the existing service account to correspond to the detected new capabilities in accordance with the proposal; and
means, in response to the request from the new wireless device, for changing the existing service account, in accordance with the proposal, to correspond to the detected new capabilities.

21. The wireless network claimed in claim 20 wherein the request to transfer service to the new wireless device includes the access number of the existing device.

22. The wireless network claimed in claim 20 further comprising:
means responsive to the transfer request for deactivating the existing wireless device for service on the wireless network.

23. The wireless network claimed in claim 20 wherein the wireless network service provider stores a service plan profile in a database associated with the unique identifier of a wireless device, and further comprising:

means responsive to the transfer request for changing the association for the wireless network database service plan profile from the unique identifier of the existing wireless device to the unique identifier of the new wireless device.

24. The wireless network claimed in claim 20 wherein the transfer of network service is accomplished with a transfer software program and further comprising:
   means, following the request for a transfer of network service, for determining whether a transfer software program presenting a series of transfer options that may be selected by the user is resident on a wireless device, and if it is not,
   means for downloading a service transfer program from the wireless network to at least one of the existing wireless device and the new wireless device.

25. The wireless network claimed in claim 20 further comprising:
   means for receiving from the existing wireless device, prior to transfer of network service associated with the existing service account, a service account security identifier, and
   means for receiving from the existing wireless device, prior to transfer of network service associated with the existing service account, the unique identifier of the new wireless device.

26. The wireless network claimed in claim 25 further comprising:
   means for receiving from the new wireless device, prior to transfer of network service associated with the existing service account, the security identifier of the existing service account for the existing wireless device.

27. The wireless network claimed in claim 20 further comprising:
   means for establishing a communications link over the wireless network between the existing wireless device and the new wireless device for transfer of information.

28. The wireless network claimed in claim 27 wherein the information transferred over the network communications link includes information comprising at least one of the existing device's access number, pictures, address book, music and data files.

29. A system to facilitate transfer, by a user of an existing wireless device, of network service to a new wireless device, the transfer using an existing service account that is associated with the existing wireless device and established with the wireless network service provider, comprising:
   a memory that stores computer readable program code; and
   a processor in communication with the memory, wherein the processor executes the computer readable program code to:
   receive from the existing wireless device having the existing service account a request to transfer the network service associated with the existing service account to the new wireless device;
   in response to the transfer request, transfer the network service associated with the existing service account and information relating to the existing service account from the existing wireless device to the new wireless device, the new wireless device having a unique identifier added, by the user, to the existing service account;
   detect capabilities of the new wireless device associated with the unique identifier by
      determining the device features associated with the new wireless device's unique identifier,
      determining the device features associated with the existing wireless device's unique identifier, and
      comparing device features associated with the new wireless device with those associated with the existing device to detect new capabilities,
      wherein the unique identifier of the new wireless device is one of an ESN, a MAC, or an IP address, and the new capabilities of the new wireless device associated with its unique identifier include at least one of image recording, video recording, music storage, and Internet connectivity;
   transmit to the new wireless device a proposal for a change to the existing service account to correspond to the detected capabilities of the new wireless device;
   in response to the transmission, receive from the new wireless device a request to change the existing service account to correspond to the new wireless device's detected capabilities in accordance with the proposal; and
   in response to the request from the new wireless device, change the existing service account, in accordance with the proposal, to correspond to the new wireless device's detected capabilities.

30. The system claimed in claim 29 wherein the request to transfer service to the new wireless device includes the access number of the existing device.

31. The system claimed in claim 29 wherein, in response to the transfer request, the processor executes the computer readable program code to:
   deactive the existing wireless device for service on the wireless network.

32. The system claimed in claim 29 wherein the wireless network service provider stores a service plan profile in a database associated with the unique identifier of a wireless device, and wherein, in response to the transfer request, the processor executes the computer readable program code to:
   change the association for the wireless network database service plan profile from the unique identifier of the existing wireless device to the unique identifier of the new wireless device.

33. The system claimed in claim 29 wherein the transfer of network service is accomplished with a transfer software program, and wherein, following the request for a transfer of network service, the processor executes the computer readable program code to:
   determine whether a transfer software program presenting a series of transfer options that may be selected by the user is resident on a wireless device, and if it is not,
   download a service transfer program from the wireless network to at least one of the existing wireless device and the new wireless device.

34. The system claimed in claim 29 wherein, before transferring the network service associated with the existing service account, the processor executes the computer readable program code to:
   receive from the existing wireless device a service account security identifier, and
   receive from the existing wireless device the unique identifier of the new wireless device.

35. The system claimed in claim 34 wherein, before transferring the service account, the processor executes the computer readable program code to:
   receive from the new wireless device the security identifier of the existing service account for the existing wireless device.

36. The system claimed in claim 29 wherein the processor executes the computer readable program code to:

establish a communications link over the wireless network between the existing wireless device and the new wireless device for transfer of information.

37. The system claimed in claim 36 wherein the processor executes the computer readable program code to: transfer over the network communications link information including at least one of the existing device's access number, pictures, address book, music and data files.

* * * * *